US011983554B2

(12) United States Patent
Radkoff et al.

(10) Patent No.: US 11,983,554 B2
(45) Date of Patent: May 14, 2024

(54) AUTOMATING SEMANTICALLY-RELATED COMPUTING TASKS ACROSS CONTEXTS

(71) Applicant: X Development LLC, Mountain View, CA (US)

(72) Inventors: Rebecca Radkoff, San Francisco, CA (US); David Andre, San Francisco, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 78 days.

(21) Appl. No.: 17/726,258

(22) Filed: Apr. 21, 2022

(65) Prior Publication Data
US 2023/0342167 A1    Oct. 26, 2023

(51) Int. Cl.
*G06F 16/242* (2019.01)
*G06F 3/0482* (2013.01)
(Continued)

(52) U.S. Cl.
CPC ........ *G06F 9/45529* (2013.01); *G06F 3/0482* (2013.01); *G06F 40/30* (2020.01); *G06F 3/167* (2013.01); *G06F 16/3329* (2019.01); *G06F 16/3344* (2019.01); *G06F 16/90332* (2019.01); *G06F 16/9535* (2019.01);
(Continued)

(58) Field of Classification Search
CPC ...... G06F 9/45529; G06F 40/30; G06F 40/58; G06F 40/40; G06F 3/0482; G06F 3/167; G06F 16/3329; G06F 16/90332; G06F 40/35; G06F 16/9535; G06F 16/3344
See application file for complete search history.

(56) References Cited

U.S. PATENT DOCUMENTS 11,393,456 B1 *  7/2022  Guo ................. G06N 3/088
11,442,992 B1 *  9/2022  Moon ............... G06N 20/00
(Continued)

OTHER PUBLICATIONS

Nadir Belhaj et al., Engaging students to fill surveys using chatbots: University case study, Oct. 2021, [Retrieved on Dec. 9, 2023]. Retrieved from the internet: <URL: https://d1wqtxts1xzle7.cloudfront.net/74671542/15562-libre.pdf?> 11 Pages (473-483) (Year: 2021).*

(Continued)

*Primary Examiner* — Anibal Rivera
(74) *Attorney, Agent, or Firm* — Gray Ice Higdon

(57) ABSTRACT

Disclosed implementations relate to automating semantically-similar computing tasks across multiple contexts. In various implementations, an initial natural language input and a first plurality of actions performed using a first computer application may be used to generate a first task embedding and a first action embedding in action embedding space. An association between the first task embedding and first action embedding may be stored. Later, subsequent natural language input may be used to generate a second task embedding that is then matched to the first task embedding. Based on the stored association, the first action embedding may be identified and processed using a selected domain model to select actions to be performed using a second computer application. The selected domain model may be trained to translate between an action space of the second computer application and the action embedding space.

18 Claims, 9 Drawing Sheets

(51) Int. Cl.
*G06F 3/0488* (2022.01)
*G06F 9/455* (2018.01)
*G06F 40/30* (2020.01)
*G06F 3/16* (2006.01)
*G06F 16/33* (2019.01)
*G06F 16/332* (2019.01)
*G06F 16/9032* (2019.01)
*G06F 16/9535* (2019.01)
*G06F 40/35* (2020.01)
*G06F 40/40* (2020.01)
*G06F 40/58* (2020.01)

(52) U.S. Cl.
CPC .............. *G06F 40/35* (2020.01); *G06F 40/40* (2020.01); *G06F 40/58* (2020.01)

(56) References Cited

U.S. PATENT DOCUMENTS

| | | | | |
|---|---|---|---|---|
| 11,532,301 | B1* | 12/2022 | Hajebi | G10L 15/1815 |
| 11,626,107 | B1* | 4/2023 | Hajebi | G06F 40/295 |
| | | | | 704/235 |
| 11,743,378 | B1* | 8/2023 | Johnston | H04M 3/4938 |
| | | | | 704/270.1 |
| 2015/0279360 | A1* | 10/2015 | Mengibar | G10L 15/1815 |
| | | | | 704/257 |
| 2016/0078019 | A1 | 3/2016 | Napieralski et al. | |
| 2018/0131645 | A1* | 5/2018 | Magliozzi | G06F 40/30 |
| 2018/0314689 | A1* | 11/2018 | Wang | G10L 15/1822 |
| 2020/0320984 | A1* | 10/2020 | Kuczmarski | G06N 20/00 |
| 2022/0050661 | A1* | 2/2022 | Lange | G06V 20/00 |
| 2022/0382565 | A1* | 12/2022 | Sunkara | G06N 3/09 |
| 2023/0396810 | A1* | 12/2023 | Ge | H04N 19/91 |

OTHER PUBLICATIONS

Li et al., "VUT: Versatile UI Transformer for Multi-Modal Multi-Task User Interface Modeling" arXiv:2112.05692v1 [cs.CV], 19 pages, dated Dec. 10, 2021.

Shvo et al., "AppBuddy: Learning to Accomplish Tasks in Mobile Apps via Reinforcement Learning" arXiv:2106.00133v2 [cs.AI], 17 pages, dated Jun. 6, 2021.

Humphreys et al., "A data-driven approach for learning to control computers" arXiv:2202.08137v1 [cs.LG], 15 pages, dated Feb. 16, 2022.

"Creating Multimodal Interactive Agents with Imitation and Self-Supervised Learning" DeepMind. arXiv:2112.03763v2 [cs.LG], 17 pages, dated Feb. 2, 2022.

Ammanabrolu et al., "How to Motivate Your Dragon: Teaching Goal-Driven Agents to Speak and Act in Fantasy Worlds" arXiv:2010.00685v3 [cs.CL], 27 pages, dated May 25, 2021.

Jia et al., "DOM-Q-NET: Grounded RL on Structured Language" arXiv:1902.07257v1 [cs.LG], 17 pages, dated Feb. 19, 2019.

Li et al., "Mapping Natural Language Instructions to Mobile UI Action Sequences" Proceedings of the 58th Annual Meeting of the Association for Computational Linguistics, pp. 8198-8210, Jul. 2020. 13 p.

Patrick Meyer, "Natural Language Processing Tasks" 11 pages, dated Oct. 19, 2021.

Giorgi et al., "Learning Actions From Natural Language Instructions Using an ON-World Embodied Cognitive Architecture" Frontiers in Neurobiotics, vol. 15, 22 pages. Retrieved from doi: 10.3389/fnbot.2021.626380.dated May 13, 2021.

Cangelosi et al., "A review of abstract concept learning in embodied agents and robots" Downloaded from https://royalsocietypublishing.org/ 6 pages, dated Feb. 28, 2022.

Vaswani et al., "Attention Is All You Need" arXiv:1706.03762v5 [cs.CL] 15 pages, dated Dec. 6, 2017.

Zhou et al., "Hierarchical Control of Situated Agents through Natural Language" arXiv:2109.08214v1 [cs.CL] 18 pages, dated Sep. 16, 2021.

Jiang et al., "Language as an Abstraction for Hierarchical Deep Reinforcement Learning" arXiv:1906.07343v2 [cs.LG], 25 pages, dated Nov. 18, 2019.

Artzi et al., Weakly Supervised Learning of Semantic Parsers for Mapping Instructions to Actions Transactions of the Association for Computational Linguistics, 1 (2013) 49-62, 14 pages. dated Mar. 2013.

Mazumder, S. et al., "FLIN: A Flexible Natural Language Interface for Web Navigation"; arXiv.org, Cornell University Library; arXiv:2010.12844v2; 12 pages; dated Apr. 13, 2021.

Fuchs, G. et al., "Automatic Form Filling with Form-BERT"; Proceedings of the 44th International ACM SIGIR Conference on Research and Development in Information; pp. 1850-1854; dated Jul. 11, 2021.

European Patent Office; International Search Report and Written Opinion issued in Application No. PCT/US2023/019151; 11 pages, dated Jun. 9, 2023.

\* cited by examiner

AUTOMATING SEMANTICALLY-RELATED COMPUTING TASKS ACROSS CONTEXTS

BACKGROUND

Individuals often operate computing devices to perform semantically-similar tasks in different contexts. For example, an individual may engage in a sequence of actions using a first computer application to perform a given task, such as setting various application preferences, retrieving/viewing particular data that is made accessible by the first computer application, performing a sequence of operations within a particular domain (e.g., 3D modeling, graphics editing, word processing), and so forth. The same individual may later engage in a semantically-similar, but syntactically distinct, sequence of actions to perform the same or semantically-similar task in a different context, such as while using a different computer application. Repeatedly performing the actions that comprise these tasks may be cumbersome, prone to error, and may consume computing resources and/or the individual's attention unnecessarily.

Many computer applications provide users with the option to record sequences of actions so that those actions can be automated, e.g., using scripting languages embedded into the computer applications. Sometimes these recorded sequences are referred to as "macros." However, these recorded sequences of actions and/or the scripts they generate may suffer from a variety of shortcomings. They tend to be constrained to operation within a particular computer application, and are often narrowly-tailored to very specific contexts. Moreover, the scripts that underlie them tend to be too complex to be understood, much less manipulated, by individuals unfamiliar with computer programming.

SUMMARY

Implementations are described herein for automating semantically-similar computing tasks across multiple contexts. More particularly, but not exclusively, implementations are described herein for enabling individuals (often referred to as "users") to permit or request sequences of actions they perform to fulfill or accomplish a task in one context, e.g., in a given computer application, in a given domain, etc., to be captured (e.g., recorded) and seamlessly extended into other contexts, without requiring programming knowledge. In various implementations, the captured sequence of actions may be abstracted as an "action embedding" in a generalized "action embedding space." This domain-agnostic action embedding may represent, in the abstract, a "semantic task" that can be translated into action spaces of any number of domains using respective domain models. Put another way, a "semantic task" is a domain-agnostic, higher order task which finds expression within a particular domain as a sequence/plurality of domain-specific actions.

Along with the captured sequences of actions (which as noted above are captured with the user's permission or at their request), individuals may provide natural language input, e.g., spoken or typed, that provides additional semantic context to these captured sequences of actions. Natural language processing (NLP) may be performed on these natural language inputs to generate "task" or "policy" embeddings that can then be associated with the contemporaneously-created action embeddings. It is then possible subsequently for individuals to provide, in different contexts, natural language input that can be matched to one or more task/policy embeddings. The matched task/policy embedding(s) may be used to identify corresponding action embedding(s) in the generalized action embedding space. These corresponding action embedding(s) may be processed using a domain model associated with the current domain/context in which the individual operates to select, from an action space of the current domain, a plurality of actions that may be syntactically distinct from, but semantically equivalent to, an original sequence of actions captured in a previous domain.

In some implementations, a method may be implemented using one or more processors and may include: obtaining an initial natural language input and a first plurality of actions performed using a first computer application; performing natural language processing (NLP) on the initial natural language input to generate a first task embedding that represents a first task conveyed by the initial natural language input; processing the first plurality of actions using a first domain model to generate a first action embedding that represents the first plurality of actions performed using the first computer application, wherein the first domain model is trained to translate between an action space of the first computer application and an action embedding space that includes the first action embedding; storing an association between the first task embedding and first action embedding in memory; performing NLP on subsequent natural language input to generate a second task embedding that represents a second task conveyed by the subsequent natural language input; determining, based on a similarity measure between the first and second task embeddings, that the second task corresponds semantically to the first task; in response to the determining, processing the first action embedding using a second domain model to select a second plurality of actions to be performed using a second computer application, wherein the second domain model is trained to translate between an action space of the second computer application and the action embedding space; and causing the second plurality of actions to be performed using the second computer application.

In various implementations, at least one of the first and second computer applications may be an operating system. In various implementations, the first plurality of actions performed using the first computer application may be intercepted from data exchanged between the first computer application and an underlying operating system. In various implementations, the exchanged data may include data indicative of keystrokes and pointing device input.

In various implementations, the first plurality of actions performed using the first computer application may be captured from an application programming interface (API) of the first computer program. In various implementations, the first plurality of actions performed using the first computer application may be captured from a domain-specific programming language associated with the first domain. In various implementations, the first plurality of actions performed using the first computer application may be captured from a scripting language embedded in the first computer application.

In various implementations, the first plurality of actions performed using the first computer application may include interactions with a first graphical user interface (GUI) rendered by the first computer application. In various implementations, the second plurality of actions performed using the second computer application may include interactions with a second GUI rendered by the second computer application.

In various implementations, the first computer application may be operable to exchange data with a first database having a first database schema, and the second computer application is operable to exchange data with a second database having a second database schema that is different from the first database schema. In various implementations, the first plurality of actions may interact with first data from the first database in accordance with the first database schema, and the second plurality of actions may interact with second data from the second database in accordance with the second database schema, and the second data corresponds semantically with the first data.

In various implementations, the first computer application may be a first communication application that has been operated to communicate with a first plurality of contacts, and the second computer application may be a second communication application that has been operated to communicate with a second plurality of contacts. In various implementations, the second task may seek past correspondence with one or more contacts that are included in the second plurality of contacts. In various implementations, the second task may also seek past correspondence with one or more contacts that are included in the first plurality of contacts.

In various implementations, the first computer application may be operable to exchange data with a first database having a first database schema, and the second computer application is operable to exchange data with a second database having a second database schema that is different from the first database schema. In various implementations, the first plurality of actions may interact with first data from the first database in accordance with the first database schema, and the second plurality of actions may interact with second data from the second database in accordance with the second database schema, and the second data may correspond semantically with the first data.

In another aspect, a method implemented using one or more processors may include: obtaining an initial natural language input and a first plurality of actions performed using a first input form configured for a first domain; performing NLP on the initial natural language input to generate a first policy embedding that represents a first input policy conveyed by the initial natural language input; processing the first plurality of actions using a first domain model to generate a first action embedding that represents the first plurality of actions performed using the first input form, wherein the first domain model is trained to translate between an action space of the first domain and an action embedding space that includes the first action embedding; storing an association between the first policy embedding and first action embedding in memory; performing NLP on subsequent natural language input to generate a second policy embedding that represents a second policy conveyed by the subsequent natural language input; determining, based on a similarity measure between the first and second policy embeddings, that the second policy corresponds semantically to the first policy; in response to the determining, processing the first action embedding using a second domain model to select a second plurality of actions to be performed using a second input form configured for a second domain, wherein the second domain model is trained to translate between an action space of the second domain and the action embedding space; and causing the second plurality of actions to be performed using the second input form. In various implementations, the first plurality of actions may include populating a first plurality of form fields with a first set of values, the second plurality of actions comprise populating a second plurality of form fields with at least some of the first set of values.

In addition, some implementations include one or more processors of one or more computing devices, where the one or more processors are operable to execute instructions stored in associated memory, and where the instructions are configured to cause performance of any of the aforementioned methods. Some implementations include at least one non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4A and FIG. 4B demonstrate an example of how techniques described herein may be used to auto-populate input forms, in accordance with various implementations.

FIG. 5A and FIG. 5B demonstrate another example of how techniques described herein may be used to auto-populate input forms, in accordance with various implementations.

DETAILED DESCRIPTION

Figure 1:
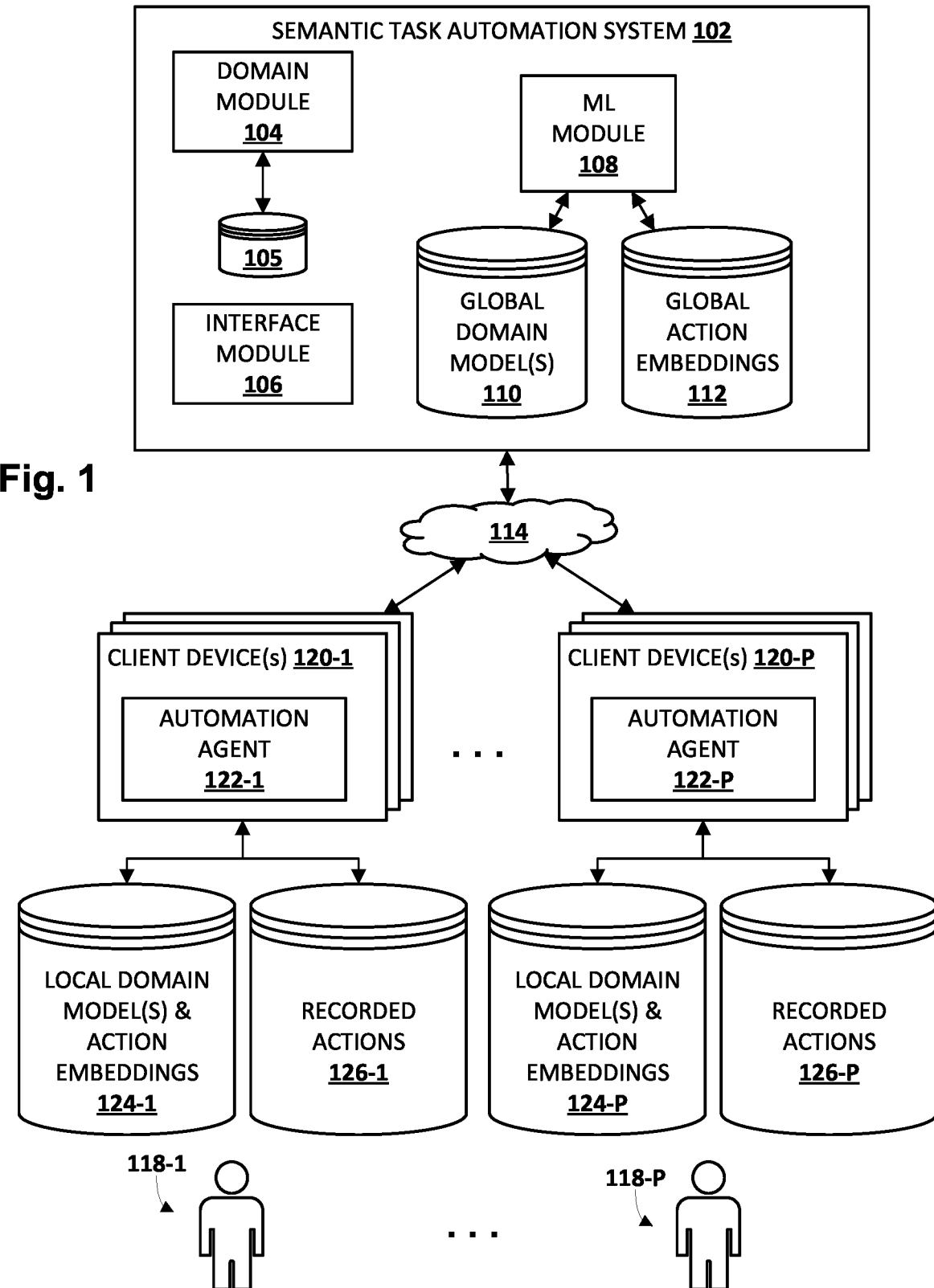
FIG. 1 is a schematic diagram of an example environment in which implementations disclosed herein may be implemented.

Implementations are described herein for automating semantically-similar computing tasks across multiple contexts. More particularly, but not exclusively, implementations are described herein for enabling individuals (often referred to as "users") to permit or request sequences of actions they perform to fulfill or accomplish a task in one context, e.g., in a given computer application, in a given domain, etc., to be captured (e.g., recorded) and seamlessly extended into other contexts, without requiring programming knowledge. In various implementations, the captured sequence of actions may be abstracted as an "action embedding" in a generalized "action embedding space." This domain-agnostic action embedding may represent, in the abstract, a "semantic task" that can be translated into action spaces of any number of domains using respective domain models. Put another way, a "semantic task" is a domain-agnostic, higher order task which finds expression within a particular domain as a sequence/plurality of domain-specific actions.

Along with the captured sequences of actions (which as noted above are captured with the user's permission or at their request), individuals may provide natural language input, e.g., spoken or typed, that provides additional semantic context to these captured sequences of actions. Natural language processing (NLP) may be performed on these natural language inputs to generate "task" or "policy" embeddings that can then be associated with the contemporaneously-created action embeddings. It is then possible subsequently for individuals to provide, in different contexts, natural language input that can be matched to one or more task/policy embeddings. The matched task/policy embedding(s) may be used to identify corresponding action embedding(s) in the generalized action embedding space. These corresponding action embedding(s) may be processed using a domain model associated with the current domain/context in which the individual operates to select, from an action space of the current domain, a plurality of actions that may be syntactically distinct from, but semantically equivalent to, an original sequence of actions captured in a previous domain.

As one non-limiting example, a user may authorize a local agent computer program (referred to herein as an "automation agent") to capture a series of operations performed by the user using a graphical user interface (GUI) of a first computer application to set various application parameters, such as setting visual parameters to a "dark mode," setting application permissions (e.g., location, camera access, etc.), or other application preferences (e.g., Celsius versus Fahrenheit, metric versus imperial, preferred font, preferred sorting order, etc.). Many of these various application parameters may not be unique to that particular computer application— other computer applications with similar functionality may have semantically-similar application parameters. However, the semantically-similar application parameters of other computer application(s) may be named, organized, and/or accessed differently (e.g., different submenus, command line inputs, etc.).

With techniques described herein, the user may provide a natural language input to describe the sequence of actions performed using the GUI of the first computer application, e.g., while performing them, or immediately before or after. A first task/policy embedding generated from NLP of this input may be associated with (e.g., mapped to, combined with) a first action embedding generated from the captured sequence of actions using a first domain model. As noted previously, the first domain model may translate between the general action embedding space and an action space of the first computer application.

Later, when operating a second computer application with similar functionality as the first computer application, the user may provide semantically similar natural language input. The second task/policy embedding generated from this subsequent natural language input may be matched to the first task/policy embedding, and hence, the first action embedding. The first action embedding may then be processed using a second domain model that translates between the general action embedding space and an action space of the second computer application to select action(s) to be performed at the second computer application. In some implementations, these selected action(s) may be performed automatically, and then the user may be prompted to provide feedback about the resulting state of the second computer application. This feedback can be used, for instance, to train the second domain model.

Techniques described herein are not limited to automating semantically-similar tasks across distinct computer applications. Other types of differing contexts and domains are contemplated. For example, a sequence of actions performed by a user to fill out input fields of a first input form, e.g., a webpage to order take out, may, at the user's request, be captured and associated with an "input policy" conveyed in natural language input provided by the user. A task/policy embedding generated from the user's natural language input may provide constraints, rules, and/or other data parameters that the user wishes to preserve for extension into other domains. When the user later fills out another input form in a different domain, e.g., grocery delivery, the user can provide natural language input that conveys the same policy, which may cause at least some input fields of the new input form to be filled with values from the previous form-filling. In this way, the user can, for instance, create multiple different procurement policies or profiles that the user can select from in different contexts (e.g., one for making personal purchases, another for making business purchases, another for making travel purchases, etc.).

Abstracting both captured sequences of actions and accompanying natural language inputs may provide a number of technical advantages. It is not necessary for individuals to provide long and detailed natural language input when the sequences of actions performed by the individuals can be abstracted into semantically-rich action embeddings that capture so much of the individuals' intents. Consequently, an individual can name an automated action with a word or short phrase, and the association between that word/phrase and the corresponding action embedding nonetheless provides sufficient semantic context for cross-domain automation.

As with many artificial intelligence models, the more training data used to train the domain models, the more accurately they will translate between various domains and the action embedding space. Human-provided feedback such as that described previously can provide particularly valuable training data for supervised training, but may not be available in abundance due to its cost. Accordingly, in various implementations, additional, "synthetic" training data may be generated and used to train the domain models, in a process that is referred to herein as variably as "self-supervised training" and "simulation." These synthetic training data may, for instance, include variations and/or permutations of user-recorded automations that are generated automatically and processed using domain models. The resulting "synthetic" outcomes may be evaluated, e.g., against "ground truth" outcomes of the original user-recorded automations and/or against user-provided natural language inputs, to determine errors. These errors can be used to train the domain models, e.g., using techniques such as back propagation and gradient descent.

As one example, suppose an individual provides a relatively simple and/or undetailed natural language input, such as a word or short phrase, to describe a sequence of actions they request recorded in a particular domain. Separately from the individual providing feedback about "ground truth" outcome(s) of extending those recorded actions to different domain(s), additional synthetic training data may be generated and used to generate synthetic outcomes of extending those recorded actions to different domain(s).

For example, the short word/phrase provided by the individual may be used to generate and/or select longer, more detailed, and/or semantically-similar synthetic natural language input(s). Then, the process may be reversed: the synthetic natural language input(s) may be processed using NLP to generate synthetic task/policy embeddings, which in turn may be processed as described herein to select action embedding(s) and generate synthetic outcome(s) in one or more domains. These synthetic outcome(s) may be compared to ground truth outcomes in the same domain(s), and/or feedback about these synthetic outcomes may be solicited from individuals, in order to train domain model(s) for those domain(s).

As used herein, a "domain" may refer to a targeted subject area in which a computing component is intended to operate, e.g., a sphere of knowledge, influence, and/or activity around which the computing component's logic revolves. In some implementations, domains in which tasks are to be extended may be identified by heuristically matching keywords in the user-provided input with domain keywords. In other implementations, the user-provided input may be processed, e.g., using NLP techniques such as word2vec, a Bidirectional Encoder Representations from Transformers (BERT) transformer, various types of recurrent neural networks ("RNNs," e.g., long short-term memory or "LSTM," gated recurrent unit or "GRU"), etc., to generate a semantic embedding that represents the natural language input. In some implementations, this natural language input semantic embedding—which as noted previously may also function as a "task" or "policy" embedding—may be used to identify one or more domains, e.g., based on distance(s) in embedding space between the semantic embedding and other embeddings associated with various domains.

In various implementations, one or more domain models may have been generated previously for each domain. For instance, one or more machine learning models—such as an RNN (e.g., LSTM, GRU), BERT transformer, various types of neural networks, a reinforcement learning policy, etc.— may be trained based on a corpus of documentation associated with the domain. As a result of this training, one or more of the domain model(s) may be at least bootstrapped so that it is usable to process what will be referred to herein as an "action embedding" to select, from an action space associated with a target domain, a plurality of candidate computing actions for automation.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or ("TPUs")) that execute computer-readable instructions stored in memory, or other types of logic such as application-specific integrated circuits ("ASIC"), field-programmable gate arrays ("FPGA"), and so forth. Some of the systems depicted in FIG. 1, such as a semantic task automation system 102, may be implemented using one or more server computing devices that form what is sometimes referred to as a "cloud infrastructure," although this is not required. In other implementations, aspects of semantic task automation system 102 may be implemented on client devices 120, e.g., for purposes of preserving privacy, reducing latency, etc.

Semantic task automation system 102 may include a number of different components configured with selected aspects of the present disclosure, such as a domain module 104, an interface module 106, and a machine learning ("ML" in FIG. 1) module 108. Semantic task automation system 102 may also include any number of databases for storing machine learning model weights and/or other data that is used to carry out selected aspects of the present disclosure. In FIG. 1, for instance, semantic task automation system 102 includes a database 110 that stores global domain models and another database 112 that stores data indicative of global action embeddings.

Semantic task automation system 102 may be operably coupled via one or more computer networks (114) with any number of client computing devices that are operated by any number of users. In FIG. 1, for example, a first user 118-1 operates one or more client devices 120-1. A pth user 118-P operates one or more client device(s) 120-P. As used herein, client device(s) 120 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor and/or touchscreen display), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided.

Domain module 104 may be configured to determine a variety of different information about domains that are relevant to a given user 118 at a given point in time, such as a domain in which the user 118 currently operates, domain(s) into which the user would like to extend semantic tasks, etc. To this end, domain module 104 may collect contextual information about, for instance, foregrounded and/or backgrounded applications executing on client device(s) 120 operated by the user 118, webpages current/ recently visited by the user 118, domain(s) in which the user 118 has access and/or accesses frequently, and so forth.

With this collected contextual information, in some implementations, domain module 104 may be configured to identify one or more domains that are relevant to a natural language input provided by a user. For instance, a request to record a task performed by a user 118 using a particular computer application and/or on a particular input form may be processed by domain module 104 to identify the domain in which the user 118 performs the to-be-recorded task, which may be a domain of the particular computer application or input form. If the user 118 later requests the same task be performed in a different target domain, e.g., using a different computer application or different input form, then domain module 104 may identify the target domain.

In some implementations, domain module 104 may also be configured to retrieve domain knowledge from a variety of different sources associated with an identified domain. In some such implementations, this retrieved domain knowledge (and/or an embedding generated therefrom) may be provided to downstream component(s), e.g., in addition to the natural language input or contextual information mentioned previously. This additional domain knowledge may allow downstream component(s), particularly machine learning models, to be used to make predictions (e.g., extending semantic tasks across different domains) that is more likely to be satisfactory.

In some implementations, domain module 104 may apply the collected contextual information (e.g., a current state)

across one or more "domain selection" machine learning model(s) 105 that are distinct from the domain models described herein. These domain selection machine learning model(s) 105 may take various forms, such as various types of neural networks, support vector machines, random forests, BERT transformers, etc. In various implementations, domain selection machine learning model(s) 105 may be trained to select applicable domains based on attributes (or "contextual signals") of a current context or state of user 118 and/or client device 120. For example, if user 118 is operating a particular website's input form to procure a good or service, that website's uniform resource locator (URL), or attributes of the underlying webpage(s), such as keywords, tags, document object model (DOM) element(s), etc. may be applied as inputs across the model, either in their native forms or as reduced dimensionality embeddings. Other contextual signals that may be considered include, but are not limited to, the user's IP address (e.g., work versus home versus mobile IP address), time-of-day, social media status, calendar, email/text messaging contents, and so forth.

Interface module 106 may provide one or more graphical user interfaces (GUIs) that can be operated by various individuals, such as users 118-1 to 118-P, to perform various actions made available by semantic task automation system. In various implementations, user 118 may operate a GUI (e.g., a standalone application or a webpage) provided by interface module 106 to opt in or out of making use of various techniques described herein. For example, users 118-1 to 118-P may be required to provide explicit permission before any tasks they perform using client device(s) 120-1 to 120-P are recorded and automated as described herein.

ML module 108 may have access to data indicative of various global domain/machine learning models/policies in database 110. These trained global domain/machine learning models/policies may take various forms, including but not limited to a graph-based network such as a graph neural network (GNN), graph attention neural network (GANN), or graph convolutional neural network (GCN), a sequence-to-sequence model such as an encoder-decoder, various flavors of a recurrent neural network (e.g., LSTM, GRU, etc.), a BERT transformer network, a reinforcement learning policy, and any other type of machine learning model that may be applied to facilitate selected aspects of the present disclosure. ML module 108 may process various data based on these machine learning models at the request or command of other components, such as domain module 104 and/or interface module 106.

Each client device 120 may operate at least a portion what will be referred to herein as an "automation agent" 122. Automation agent 122 may be a computer application that is operable by a user 118 to perform selected aspects of the present disclosure to facilitate extension of semantic tasks across disparate domains. For example, automation agent 122 may receive a request and/or permission from the user 118 to record a sequence of actions performed by the user 118 using a client device 120 in order to complete some task. Without such explicit permission, automation agent 122 may not be able to monitor the user's activity.

In some implementations, automation agent 122 may take the form of what is often referred to as a "virtual assistant" or "automated assistant" that is configured to engage in human-to-computer natural language dialog with user 118. For example, automation agent 122 may be configured to semantically process natural language input(s) provided by user 118 to identify one or more intent(s). Based on these intent(s), automation agent 122 may perform a variety of tasks, such as operating smart appliances, retrieving information, performing tasks, and so forth. In some implementations, a dialog between user 118 and automation agent 122 (or a separate automated assistant that is accessible to/by automation agent 122) may constitute a sequence of tasks that, as described herein, can be captured, abstracted into a domain-agnostic embedding, and then extended into other domains.

For example, a human-to-computer dialog between user 118 and automation agent 122 (or a separate automated assistant, or even between the automated assistant and a third party application) to order a pizza from a first restaurant's third party agent (and hence, a first domain) may be captured and used to generate an "order pizza" action embedding. This action embedding may later be extended to ordering a pizza from a different restaurant, e.g., via the automated assistant or via a separate interface.

In FIG. 1, each of client device(s) 120-1 may include an automation agent 122-1 that serves first user 118-1. First user 118-1 and his/her automation agent 122-1 may have access to and/or may be associated with a "profile" that includes various data pertinent to performing selected aspects of the present disclosure on behalf of first user 118-1. For example, automation agent 122 may have access to one or more edge databases or data stores associated with first user 118-1, including an edge database 124-1 that stores local domain model(s) and action embeddings, and/or another edge database 126-1 that stores recorded actions. Other users 118 may have similar arrangements. Any of data stored in edge databases 124-1 and 126-1 may be stored partially or wholly on client devices 120-1, e.g., to preserve the privacy of first user 118-1. For example, recorded actions 126-1, which may include sensitive and/or personal information of first user 118-1 user such as payment information, address, phone numbers, etc., may be stored in its raw form locally on a client device 120-1.

The local domain model(s) stored in edge database 124-1 may include, for instance, local versions of global model(s) stored in global domain model(s) database 110. For example, in some implementations, the global models may be propagated to the edge for purposes of bootstrapping automation agents 122 to extend tasks into new domains associated with those propagated models; thereafter, the local models at the edge may or may not be trained locally based on activity and/or feedback of the user 118. In some such implementations, the local models (in edge databases 124, alternatively referred to as "local gradients") may be periodically used to train global models (in database 110), e.g., as part of a federated learning framework. As global models are trained based on local models, the global models may in some cases be propagated back out to other edge databases (124), thereby keeping the local models up-to-date.

However, it is not a requirement in all implementations that federated learning be employed. In some implementations, automation agents 122 may provide scrubbed data to semantic task automation system 102, and ML module 108 may apply models to the scraped data remotely. In some implementations, "scrubbed" data may be data from which sensitive and/or personal information has been removed and/or obfuscated. In some implementations, personal information may be scrubbed, e.g., at the edge by automation agents 122, based on various rules. In other implementations, scrubbed data provided by automation agents 122 to semantic task automation system 102 may be in the form of reduced dimensionality embeddings that are generated from raw data at client devices 120.

As noted previously, edge database 126-1 may store actions recorded by automation agent 122-1. Automation agent 122-1 may record actions in a variety of different ways, depending on the level of access automation agent 122-1 has to computer applications executing on client device 120-1 and permissions granted by the user 118. For example, most smart phones include operating system (OS) interfaces for providing or revoking permissions (e.g., location, access to camera, etc.) to various computer applications. In various implementations, such an OS interface may be operable to provide/revoke access to automation agent 122, and/or to select a particular level of access automation agent 122 will have to particular computer applications.

Automation agent 122-1 may have various levels of access to the workings of computer applications, depending on permissions granted by the user 118, as well as cooperation from software developers that provide the computer applications. Some computer applications may, e.g., with the permission of a user 118, provide automation agent 122 with "under-the-hood" access to the applications' APIs, or to scripts writing using programming languages (e.g., macros) embedding in the computer applications. Other computer applications may not provide as much access. In such cases, automation agent 122 may record actions in other ways, such as by capturing screen shots, performing optical character recognition (OCR) on those screenshots to identify menu items, and/or monitoring user inputs (e.g., interrupts caught by the OS) to determine which graphical elements were operated by the user 118 in which order. In some implementations, automation agent 122 may intercept actions performed using a computer application from data exchanged between the computer application and an underlying OS (e.g., via system calls). In some implementations, automation agent 122 may intercept and/or have access to data exchanged between or used by window managers and/or window systems.

Figure 2:
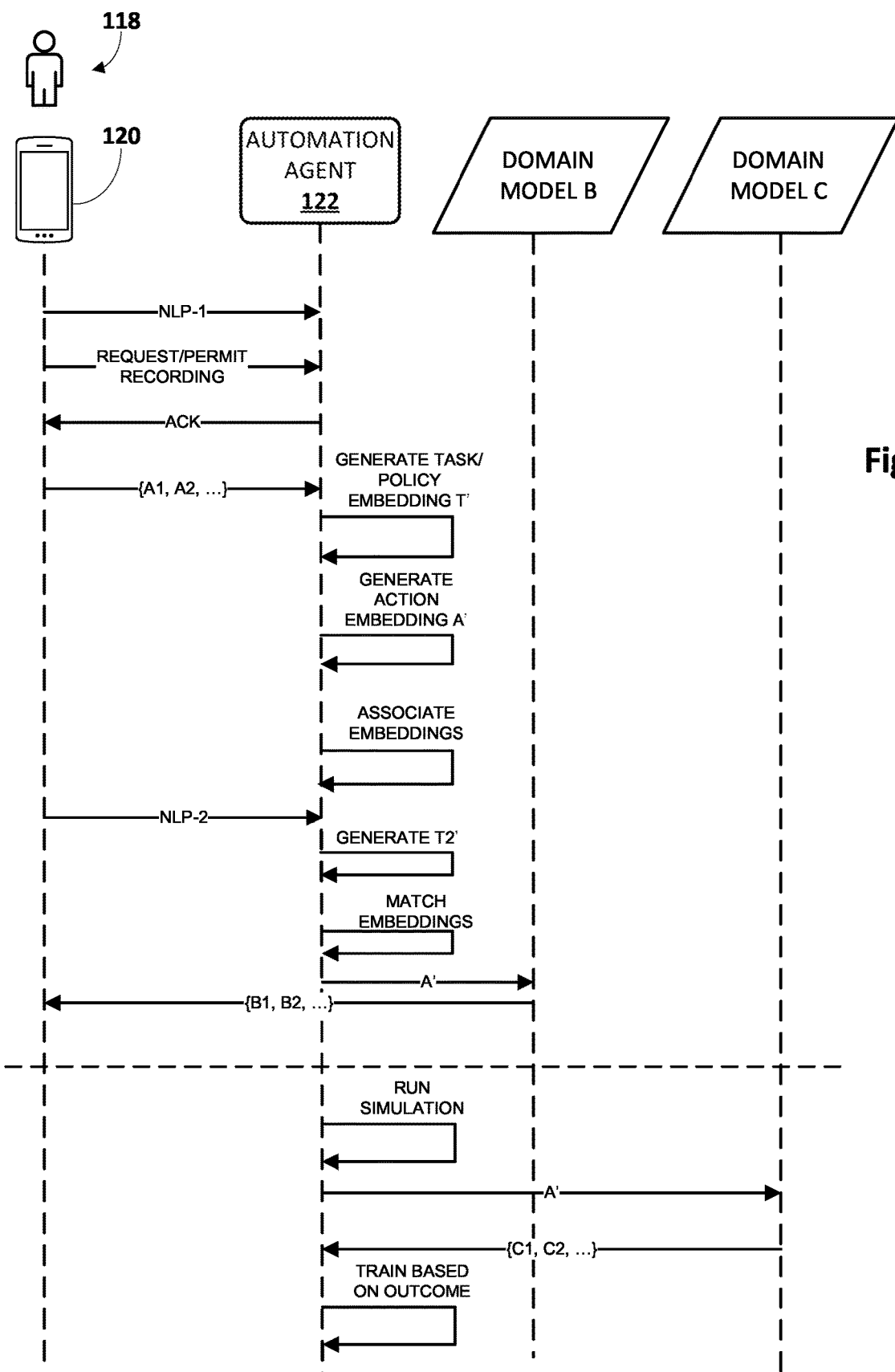
FIG. 2 schematically illustrates an example of how data may be exchanged and/or processed to extend a task performed in one domain into additional domains, in accordance with various implementations.

FIG. 2 schematically depicts an example of how data may be processed by and/or using various components across domains. Starting at top left, a user 118 operates a client device 120 to provide typed or spoken natural language input NLP-1. In the latter case, the spoken utterance may first be processed using a speech-to-text (STT) engine (not depicted) to generate speech recognition output. Whichever the case, NLP-1 may be provided to automation agent 122.

In addition, user 118 operates client device 120 to request and/or permit recording of actions performed by user 118 using client device 120. In various implementations, automation agent 122 is unable to record actions without receiving this permission. In some implementations, this permission may be granted on an application-by-application basis, much in the way applications are granted permission to access GPS coordinates, local files, use of an onboard camera, etc. In other implementations, this permission may be granted only until user 118 says otherwise, e.g., by pressing a "stop recording" button akin to recording a macro, or by providing a speech input such as "stop recording" or "that's it."

Once the request/permission is received, in some implementations, automation agent 122 may acknowledge the request/permission. Next, a sequence of actions {A1, A2, . . . } performed by user 118 in domain A using client device 120 may be captured and stored in edge database 126. These actions {A1, A2, . . . } may take various forms or combinations of forms, such as command line inputs, as well as interactions with graphical element(s) of one or more GUIs using various types of inputs, such as pointer device (e.g., mouse) inputs, keyboard inputs, speech inputs, gaze inputs, and any other type of input capable of interacting with a graphical element of a GUI.

In various implementations, the domain (A) in which these actions are performed may be identified, e.g., by domain module 104, using any combination of NLP-1, a computer application operated by user 118, a remote service (e.g., email, text messaging, social media) accessed by a user, a project the user is working on, and so forth. In some implementations, the domain may be identified at least in part by an area of a simulated digital world, sometimes referred to as a "metaverse," in which in user 118 operates or visits virtually. For example, user 118 may record actions that cause their score and a brief video replay of their performance in a first metaverse game (i.e. a first domain) to be posted to their social media. User 118 may later wish to perform a semantically similar task for a completely different metaverse game (i.e. a second domain)—techniques described herein may allow user 118 to seamlessly extend the actions previously recorded in the first domain to semantically-correspondent or semantically-equivalent actions the second domain.

Referring back to FIG. 2, based at least in part on the natural language input, automation agent 122 may generate a task/policy embedding T'. For example, automation agent 122 may perform (or cause to be performed) STT processing on speech input provided by user 118. The resulting speech recognition output may then be processed using various natural language processing techniques, including but not limited to techniques such as word2vec, BERT transformers, etc., to generate the task/policy embedding T' that represents the semantics of what user 118 said.

Based on captured domain-specific actions {A1, A2, . . . }, automation agent 122 may generate an action embedding A' that semantically represents the semantic task expressed by the domain-specific actions {A1, A2, . . . }. Automation agent 122 may associate this action embedding A' and the task/policy embedding T' in various ways. In some implementations, these embeddings A', T' may be combined, e.g., via concatenation or by being processed together to generate a joint embedding in joint embedding space that captures the semantics of both the natural language input from user 118 and actions {A1, A2, . . . }. In other implementations, these embeddings A', T' may be in separate embeddings spaces: a generalized action embedding space for the action embedding A', and a task/policy embedding space for the task/policy embedding T'. A mapping (e.g., lookup table) may be stored between these two embeddings A', T' in these two embedding spaces.

Sometime later, user 118 may issue another natural language input, NLP-2, at client device 120 or at another computing device associated with user 118, such as another computing device in a coordinated ecosystem of computing devices registered to an online profile of user 118. NLP-2 may be identical to, or at least semantically equivalent to, NLP-1. However, user 118 may be operating in a different domain, domain B. Natural language processing may be performed on NLP-2 to generate another task/policy embedding T2'. Automation agent 122 may match T2' to the previous task/policy embedding T' ("MATCH EMBEDDINGS" in FIG. 2) generated from NLP-1. This matching may be based on, for instance, distance or similarity in embedding space between T' and T2'. These distance and/or similarity measures may be calculated using various techniques, such as Euclidean distance, cosine similarity, dot product, etc.

Once automation agent 122 has matched the task/policy embedding T2' generated from NLP-2 to task/policy embedding T' generated from NLP-1, automation agent 122 may, based on the association created previously between A' and T', process the action embedding A' (or provided it to another component to process) using a domain model B. Domain model B may be trained to translate between the general action embedding space and an action space associated with a domain B. Accordingly, processing action embedding A' using domain model B may generate a probability distribution across the action space of domain B. This probability distribution may be used, e.g., by automation agent 122, to select one or more domain-specific actions {B1, B2, . . . } from action space of domain B.

Actions such as {B1, B2, . . . } may be selected from a domain's action space in various ways. In some implementations, the actions may be selected in random order, or in order of their probabilities. In some implementations, various sequences or permutations of the selected actions may be performed, e.g., as part of a real-time simulation, and the outcomes (e.g., success or failure) may dictate which permutation is actually performed for user 118. Once a domain model is sufficiently trained, it may be better at predicting an order in which actions should be performed.

In any case, the selected actions {B1, B2, . . . } may be provided by automation agent 122 to client device 120, so that client device 120 can perform them. In some cases this may cause interactive elements of a GUI displayed on client device 120 to be operated automatically, with the operations being rendered as they are performed. In other implementations, these GUI operations may be performed without re-rendering.

In various implementations, simulation may be performed, e.g., by automation agent 122 and/or components of semantic task automation system 102, to further train domain models. More particularly, various permutations of actions may be simulated to determine synthetic outcomes. These synthetic outcomes may be compared, for instance, to natural language inputs associated with the original sets of actions from which the simulated permutations are selected. The successes or failures of these synthetic outcomes may be used as positive and/or negative training examples for domain models. In this way, it is possible to train domain models based on far more than the user-recorded actions and accompanying natural language inputs.

An example of simulation to generate synthetic outcomes is depicted at bottom of FIG. 2 below the horizontal dashed line. At some point in time, e.g., during the night when server computers are under relatively low computational burdens, and without being specifically requested to do so, automation agent 122 may run one or more simulations. For example, automation agent 122 may process action embedding A' based on a domain model C. As described above, this may generate a probability distribution over the action space of domain C. Based on this probability distribution, automation agent 122 may select actions {C1, C2, . . . } to be performed to generate synthetic outcome(s). In some implementations, automation agent 122 may simulate multiple different permutations of actions {C1, C2, . . . } in order to generate multiple different synthetic outcomes. Each of these synthetic outcomes may then be evaluated for success or failure (or various intermediate measures thereof). Domain model C may be trained based on this evaluation.

While simulation is depicted as being performed in FIG. 2 as part of a domain (C) that user 118 has not yet operated in, this is not meant to be limiting. In various implementations, simulation may be performed in other domains, such as in domain B in FIG. 2. For example, different permutations of actions {B1, B2, . . . } may be performed to determine how resilient the domain-agnostic semantic task is to reordering of these actions. Moreover, it is not required that all selected actions in any given domain be performed to generate every synthetic outcome.

Figure 3:
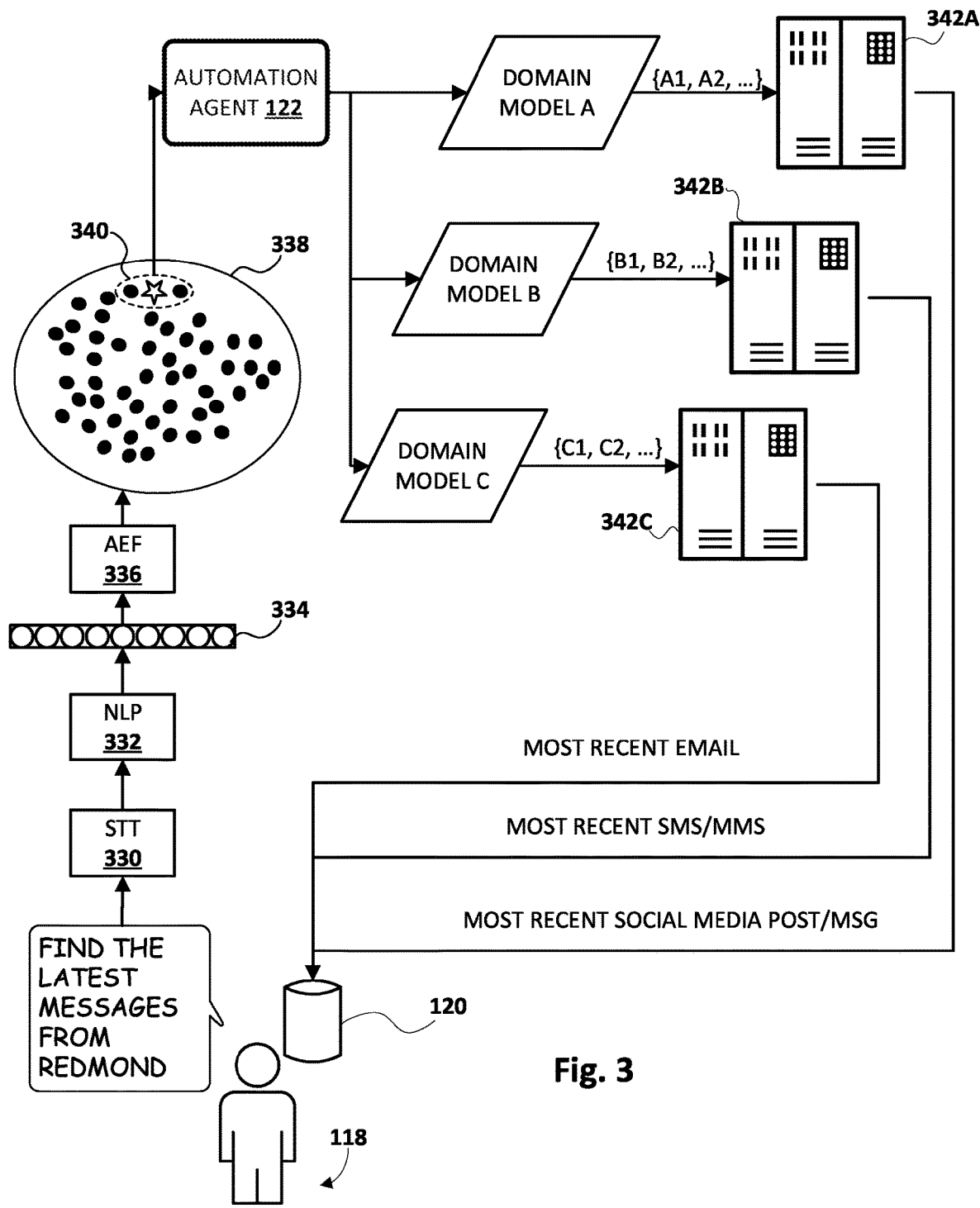
FIG. 3 schematically illustrates another example of how data may be processed to perform a single task across multiple domains, in accordance with various implementations.

FIG. 3 schematically depicts, from a different perspective than FIG. 2, another example of how techniques described herein may be used to perform a semantic task across multiple different domains. Starting at bottom left, a user 118 operates a client device 120 (in this example, a stand-alone interactive speaker) and speaks a natural language command, "Find the latest messages from Redmond." A STT module 330 may perform STT processing to generate speech recognition output. The speech recognition output may be processed by a natural language process (NLP) module 332 to generate text/policy embedding 334. An action embedding finder ("AEF" in FIG. 3) module 336 may match text/policy embedding 334 to an action embedding (white star) in an action embedding space 338. In various implementations, STT module 330, NLP module 332, and/or AEF module 336 may be implemented as part of automation agent 122, as part of semantic task automation system 102, or any combination thereof.

Action embedding space 338 may include a plurality of action embeddings, each represented in FIG. 3 by a block dot. These domain-agnostic action embeddings may be abstractions of domain-specific actions recorded in various domains' action spaces. These recorded actions may, when processed based on respective domain models, be abstracted to the embeddings shown as part of embedding space 338. Embedding space 338 is depicted as two-dimensional for purposes of illustration and understanding only. It should be understood that embedding space 338 would, in fact, have as many dimensions as the individual embeddings, which could be hundreds, or even thousands, of dimensions.

The white star represents the coordinate in action embedding space 338 associated with task/policy embedding 334. As can be seen in FIG. 3, this white star in fact lies between two action embeddings enclosed by ellipse 340. In some implementations, multiple action embeddings may match a single natural language input, e.g., because those action embeddings are semantically-similar to each other and/or were performed in response to semantically-similar natural language inputs. In some implementations, multiple matching action embeddings, such as the two within ellipse 340, may be combined into a unified representation, e.g., via concatenation or averaging, and the unified action embedding may be processed by downstream components.

Automation agent 122 may then process, of have processed, the action embedding(s) using a plurality of domain models A-C, each associated with a different domain in which user 118 communicates with others. Domain A may represent, for instance, an email domain served by one or more email servers 342A. Domain B may represent, for instance, a simple messaging service (SMS) or multimedia messaging service (MMS) domain served by one or more SMS/MMS servers 342B. Domain C may represent, for instance, a social media domain served by one or more social media servers 342C. Any of servers 342A-C may or may not be part of a cloud infrastructure, and therefore may not necessarily be tied to particular server instances.

Processing the selected action embedding(s) based on domain model A may generate actions {A1, A2, . . . }, similar to described previously. Likewise, processing the selected action embedding(s) based on domains model B and C may generate, respectively, actions {B1, B2, . . . } and {C1, C2, . . . }. These actions may be performed in their respective domains by servers 342A-C. As a result, email server(s) 342A may retrieve and return, e.g., to client device 120 (e.g., by way of automation agent 122), the most recent email(s) where someone named "Redmond" was a sender or recipient. SMS/MMS server(s) 342B may retrieve and return, e.g., to client device 120 (e.g., by way of automation agent 122), the most recent text message(s) where someone named "Redmond" was a sender or recipient. And social media server(s) 342C may retrieve and return, e.g., to client device 120 (e.g., by way of automation agent 122), the most recent social media posts or messages (e.g., "direct messages") by, from, or to someone named "Redmond" who is a friend of user 118. In some implementations, all of these returned messages may be collated and presented to user 118. In other implementations, these returned messages may be compared to identify the most recent, and that message alone may be presented to user 118. For example, where the client device 120 is a standalone interactive speaker without display capabilities, as is the case in FIG. 3 (or as might be the case in a vehicle, for instance), it may be advantageous to minimize the amount of output to avoid inundating or distracting user 118, in which case the most recent message of any of the domains may be read aloud.

Figures 4A, 4B:
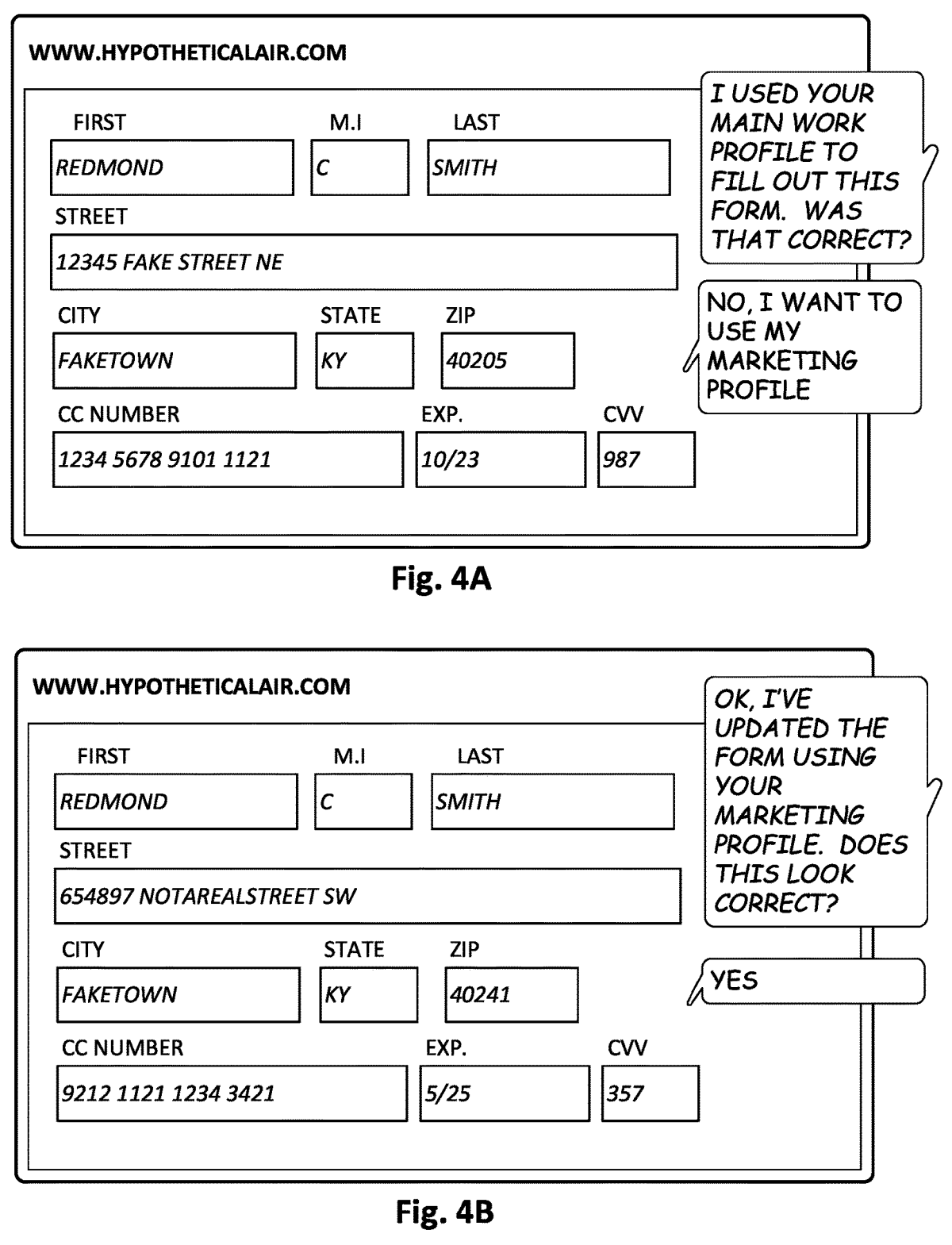

FIGS. 4A and 4B depict examples of an input form that may be rendered, for instance, by a web browser based on hypertext markup language (HTML) or the extensible markup language (XML) when a user (not depicted) visits a website "www.hyptotheticalair.com" to purchase a plane ticket. Depicted is a fairly standard input form that solicits the user's personal information and accompanying payment information. It can be assumed that the user operating this input form has created some number of payment profiles or policies, each corresponding to different payment information. For example, the user may have used techniques described herein to record themselves filling out (i.e. performing a sequence of actions) one form to create a "work profile" in which a "work" credit card was used, and filling out (i.e. performing another sequence of actions) another form to create a "marketing profile" in which a different, "marketing" credit card was used.

In FIG. 4A, the input fields of the input form have been pre-populated, as indicated by the natural language output provided by automation agent 122 (not depicted), which states, "I used your main work profile to fill out this form. Was that correct?" This may be because domain module 104 has applied various contextual signals, such as the URL "hypotheticalair.com," or attributes of the underlying webpage(s) (e.g., tags, keywords, DOM objects, topics, etc.), as inputs across domain selection model(s) 105 to select a domain to which the user's mail work profile is associated.

The user responds, "No, I want to use my marketing profile." As a result, in FIG. 4B, the values used to prepopulate the input form have changed to the user's marketing profile. Automation agent 122 says, "OK, I've updated the form using your marking profile. Does this look correct?" The user responds, "Yes." In some implementations, the user's affirmative response may cause the input form to be submitted, e.g., to complete or advance to a different stage of the purchase. Additionally or alternatively, in some implementations, automation agent 122 may capture various features of the input form, such as the website URL, layout of the input fields, or other contextual features of the input form. Using these extracted contextual features, automation agent 122 may train one or more domain selection models 105 so that, in the future, a visit to the same website, or to a semantically-similar website in a similar context, will cause the user's marketing profile information to be used to auto-populate the input form, rather than the user's main work profile.

Domain models (as opposed to domain selection models 105) may also be trained based on the user's feedback. For example, if the user identifies a particular field that was incorrectly populated (e.g., the wrong expiration date for the credit card used), the domain-specific model may be trained based on that error, e.g., using gradient descent and/or back propagation.

Figures 5A, 5B:
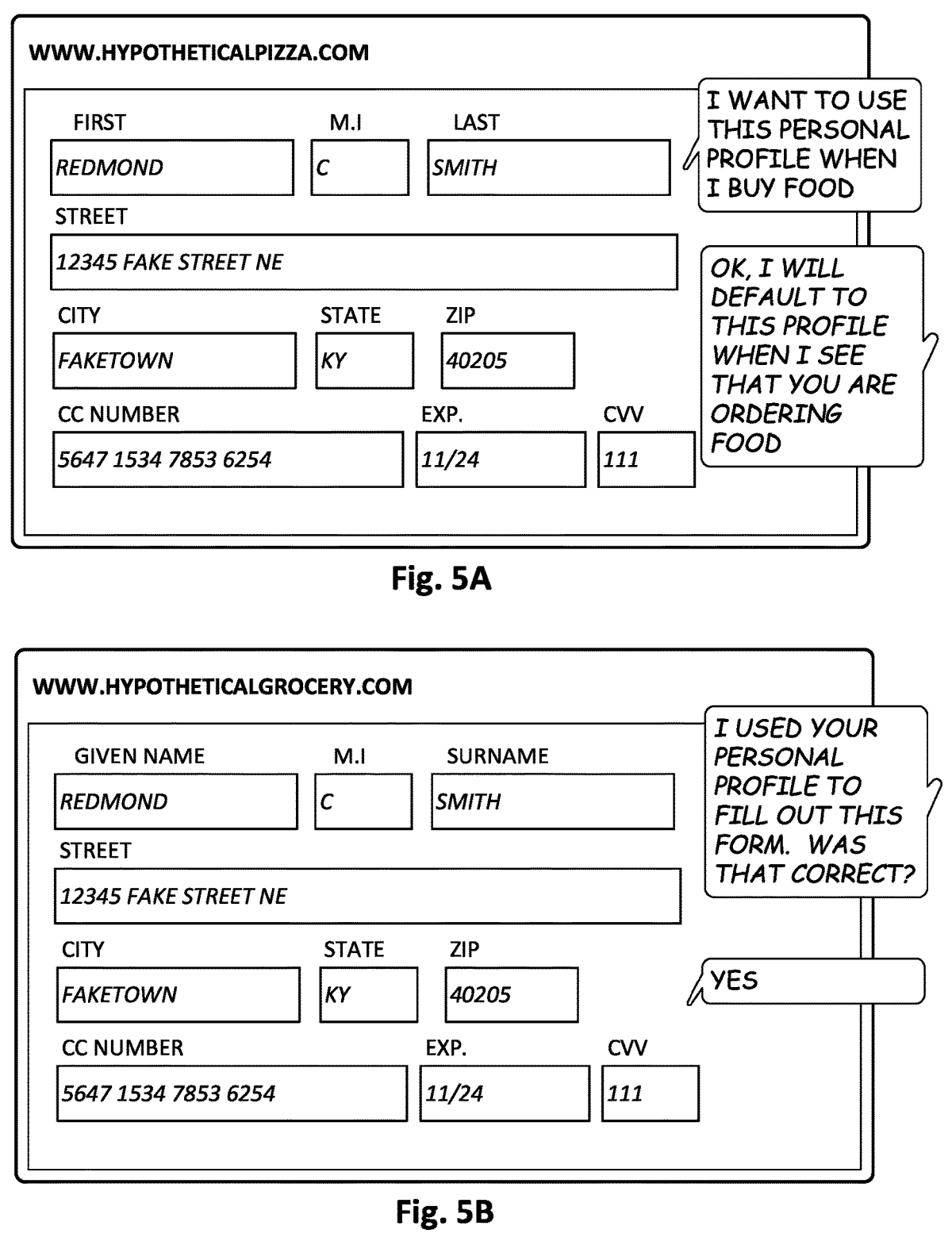

FIGS. 5A and 5B depict more examples of an input form that may be rendered, for instance, by a web browser based on HTML or XML when a user (not depicted) visits a website "www.hypotheticalpizza.com" to order a pizza. In this example it can be assumed that the user has not yet set up a "personal" profile for procuring/purchasing personal items, particularly foodstuffs. Accordingly, in FIG. 4A, the user has manually filled out the input fields to include, among other things, an address and credit card information that the user wishes to be used to purchase pizza in this instance. Additionally, the user has provided natural language input to automation agent 122 (not depicted), "I want to use this personal profile when I buy food."

Automation agent 122 responds, "OK, I will default to this profile when I see that you are ordering food." Then, using techniques described herein, automation agent 122 may capture the actions performed by the user to fill out these fields. Automation agent 122 may perform techniques described herein to associate an action embedding that abstracts these actions with all or part of the user's natural language input, such as "personal profile." This domain-agnostic action embedding may later be extended into other domains, as described herein, such as other websites that are operable to order other types of foodstuffs, such as groceries, different restaurants (e.g., other pizza restaurants or other types of restaurants), etc.

Notably, automation agent 122 in this example is able to retroactively record actions performed by the user previously, instead of recording actions that occur subsequent to the user's natural language input. In some implementations, automation agent 122 or another component may, with express permission or opt-in by a user, maintain a stack or buffer of actions performed by the user when, for instance, filling out input forms. Should the user decide after performing these actions that they'd like to record them for extension across disparate domains, the user can make a declaration like the one shown in FIG. 5A, and this stack or buffer may be used to retrieve the already-performed actions retroactively for automation of the semantic task.

FIG. 5B depicts another input form, this time for a website with the URL, "hypotheticalgrocery.com." Like "hypotheticalpizza.com," "hypotheticalgrocery.com" relates to food, albeit with a different entity (hypotheticalpizza versus hypotheticalgrocery). As shown in FIG. 5A, automation agent 122 has auto-populated the input fields with the same payment information used in FIG. 5A, when the user created his or her "personal profile." More particularly, domain module 104 has applied various contextual signals to a domain selection model 105 to identify a domain of the input form. Next, automation agent 122 applies the action embedding generated with respect to FIG. 5A as input across a domain model associated with the identified domain (e.g., a general "food" or "grocery" domain). The domain model may be trained to translate between the action embedding space and the identified domain. Consequently, application of the action embedding across the domain model generates a probability distribution over actions in the identified domain. These actions include populating the input fields of FIG. 5B as shown.

Notably, despite the fact that two of the name input fields in FIG. 5B are different than their corresponding fields in FIG. 5A—"Given name" instead of "first," and "surname" instead of "last"—the abstraction of the actions performed on the input form of FIG. 5A allows these details to be abstracted out of the domain-agnostic action embedding that resulted from FIG. 5A. Consequently, when this domain-agnostic action embedding is then translated into concrete actions in the "hypotheticalgrocery" domain, the domain model associated with the "hypotheticalgrocery" domain may translate between these semantically-equivalent terms accordingly.

Automation agent 122 notifies the user of such, saying, "I used your personal profile to fill out this form. Was that correct?" The user responds in the affirmative. In some implementations, this may be used as a positive training example to further train the domain model that was used to auto-populate the input form of FIG. 5B. Additionally or alternatively, in some implementations, automation agent 122 and/or domain model 104 may train one or more domain selection machine learning models 105 that, based on the context of FIG. 5B, the user's "personal" payment profile should be applied. The "context" of FIG. 5B may include the URL "hypotheticalgrocery.com," tags or other attributes of the underlying webpage(s), information about the user, information about a computing device operated by the user (e.g., home IP address versus work IP address), and so forth.

Figure 6:
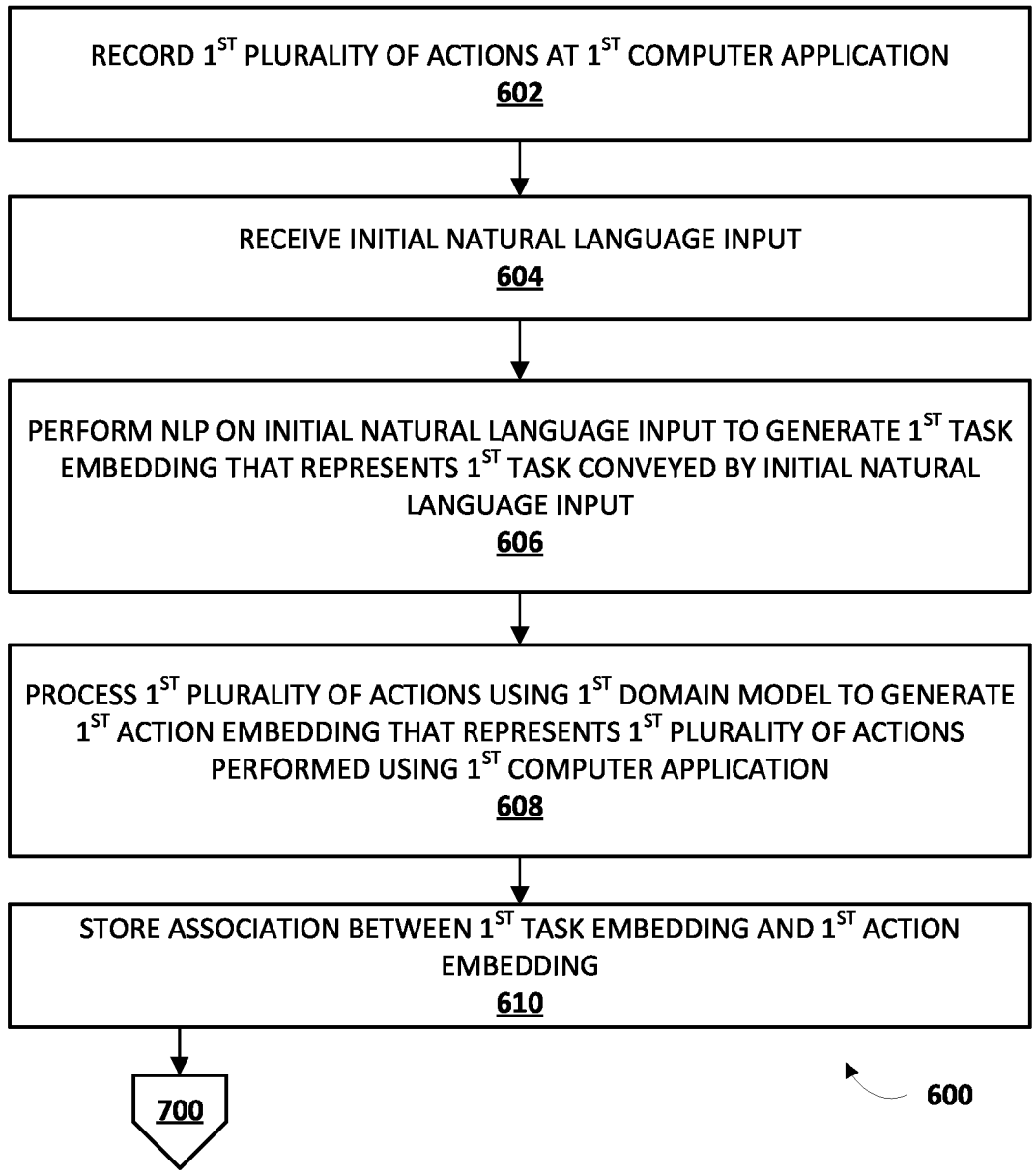
FIG. 6 is a flowchart illustrating an example method of practicing selected aspects of the present disclosure, according to implementations disclosed herein.

FIG. 6 is a flowchart illustrating an example method 600 for practicing selected aspects of the present disclosure, according to implementations disclosed herein. For convenience, the operations of the flow chart are described with reference to a system that performs the operations. This system may include various components of various computer systems, such as one or more components of semantic task automation system 102. Moreover, while operations of method 600 are shown in a particular order, this is not meant to be limiting. One or more operations may be reordered, omitted or added.

At block 602, the system may, at the request of user 118, record a first plurality of actions performed by user 118 at a first computer application. At block 604, the system may, e.g., by way of automation agent 122, receive an initial natural language input that conveys information about a task performed or to be performed by user 118. This natural language input may be received as typed text or a spoken utterance. In some implementations where the client device 120 being used also includes a camera, user 118 may provide gesture(s) or other visual cues (e.g., sign language) as additional inputs.

At block 606, the system, e.g., by way of automation agent 122 or ML module 108, may perform NLP on the initial natural language input to generate a first task (or policy) embedding that represents a first task (or policy) conveyed by the initial natural language input. For example, automation agent 122 or ML module 108 may process the natural language input using a NLP machine learning model(s) and/or techniques such as word2vec, BERT transformer(s), etc., in order to generate first task (or policy) embedding.

At block 608, the system, e.g., by way of automation agent 122 and/or ML module 108, may process the first plurality of actions using a first domain model (e.g., selected by domain module 104 using one or more domain selection machine learning models 105) to generate a first action embedding. The first action embedding may represent, in a reduced-dimensionality form, the first plurality of domain-specific actions performed using the first computer application. To this end, the first domain model may be trained to translate between an action space of the first computer application and an action embedding space that includes the first action embedding.

At block 610, the system, e.g., by way of automation agent 122, may store an association between the first task embedding and first action embedding in memory. For example, automation agent 122 may store a single embedding in a joint task/action embedding space that includes both the task (or policy) embedding generated at block 606 and the action embedding generated at block 608 (e.g., as an average or concatenation of the two). Additionally or alternatively, in some implementations, automation agent 122 may store a mapping (e.g., as part of a lookup table) between the two embeddings.

The operations forming method 600 in FIG. 6 may be performed when user 118 initially wishes to record a semantic task. Subsequently, automated semantic task may be extended into other domain(s). As indicated in FIG. 6 by block 700, example operations for extending such a semantic task into other domain(s) are depicted as part of method 700 in FIG. 7.

Figure 7:
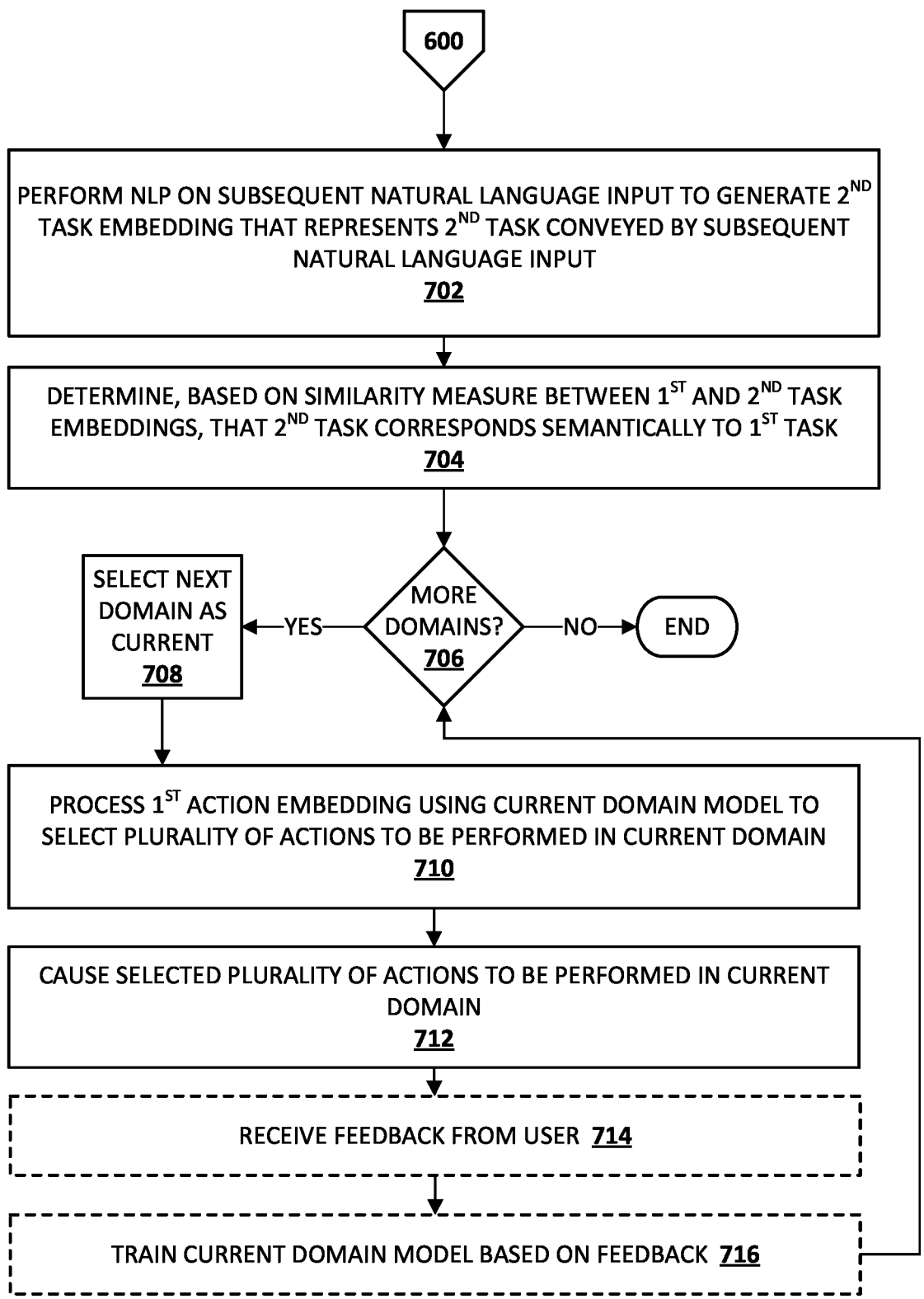
FIG. 7 is a flowchart illustrating another example method of practicing selected aspects of the present disclosure, according to implementations disclosed herein.

Referring now to FIG. 7, at block 702, the system, e.g., by way of automation agent 122, may perform NLP on subsequent natural language input to generate a second task embedding that represents a second task conveyed by the subsequent natural language input. As was the case with block 606, other types of contextual signals and/or visual cues (e.g., gesture(s)) may be used as inputs as part of the processing of block 702.

At block 704, the system, e.g., by way of automation agent 122, may determine that, based on a similarity measure between the first and second task embeddings, the second task corresponds semantically to the first task. Such a similarity measure may be determined in various ways, such as via Euclidian distance, cosine similarity, dot product, etc.

In response to the determining of block 704, the system, e.g., by way of automation agent 122 or domain module 104, may identify one or more applicable domains in which the user wishes to perform the semantic task. In many cases, this may be a single domain, e.g., the domain of a computer application being operated by the user currently that the user wishes to perform the semantic task (e.g., applying a dark theme, setting preferences, etc.). However, and as shown in FIG. 3, for instance, there may be multiple applicable domains in which the user wishes to have the semantic task extended/performed at once.

Accordingly, at block 706, the system, e.g., by way of automation agent 122 or domain module 104, may determine whether there are more applicable domains into which the semantic task is to be extended/performed. If the answer is no, then method 700 ends. However, if the answer at block 706 is yes, then method 700 proceeds to block 708, where the next applicable domain is selected as the current domain.

At block 710, the system, e.g., by way of automation agent 122 or ML module 108, may processes the first action embedding using a domain model associated with the current domain to select a current plurality of domain-specific actions to be performed in the current domain. Akin to the first domain model described with respect to FIG. 6, the current domain model may be trained to translate between an action space of the current domain (e.g., a second computer application, a second input form, etc.) and the action embedding space.

At block 712, the system, e.g., by way of automation agent 122, may cause the second plurality of actions to be performed in the current domain. If the current domain is a computer application with a GUI, the plurality of actions may be performed, e.g., by automation agent 122, on the GUI automatically. In some implementations, the GUI may be updated visually at each step so that the user can see the actions being performed. In other implementations, the actions may be performed without updating the GUI, so that the user only sees the end result of the plurality of actions.

At optional block 714, the system, e.g., by way of automation agent 122, may receive feedback from the user about performance of the semantic task in the current domain. This feedback may be solicited by automation agent 122 or provided without solicitation from the user. At block 716, the system, e.g., by way of automation agent 122 or ML module 108, may train the current domain model based on the feedback. If the current domain model is local to the client device (e.g., in the federated learning framework depicted in FIG. 1, stored in the edge database 124), the local model may be trained, and may or may not be propagated (as a local gradient) to the global model database 110 to cause the corresponding global model to be trained.

Method 700 may proceed from block 716 (or if blocks 714-716 are omitted, 712) back to block 706, where the system may once again determine whether there are any applicable domains. In some implementations, the applicable domains may be configured by a user. For example, the user may register multiple domains such as email, SMS/MMS, and social media as depicted in FIG. 3. In other implementations, and with the user's permission or opt-in, the system, e.g., by way of domain module 104, may automatically determine applicable domains. For instance, domain module 104 may consult a digital contact list of the user to identify communication modalities (e.g., email addresses, phone numbers, social media or instant messaging handles, etc.) associated with individual contacts. Suppose the user requests the latest written correspondence from Delia Sue. If Delia Sue's digital contact card includes an email address, a phone number, and a gaming pseudonym, then three domains may be applicable: email, SMS/MMS, and the domain in which Delia Sue communicates with other gamers using her gaming pseudonym.

Figure 8:
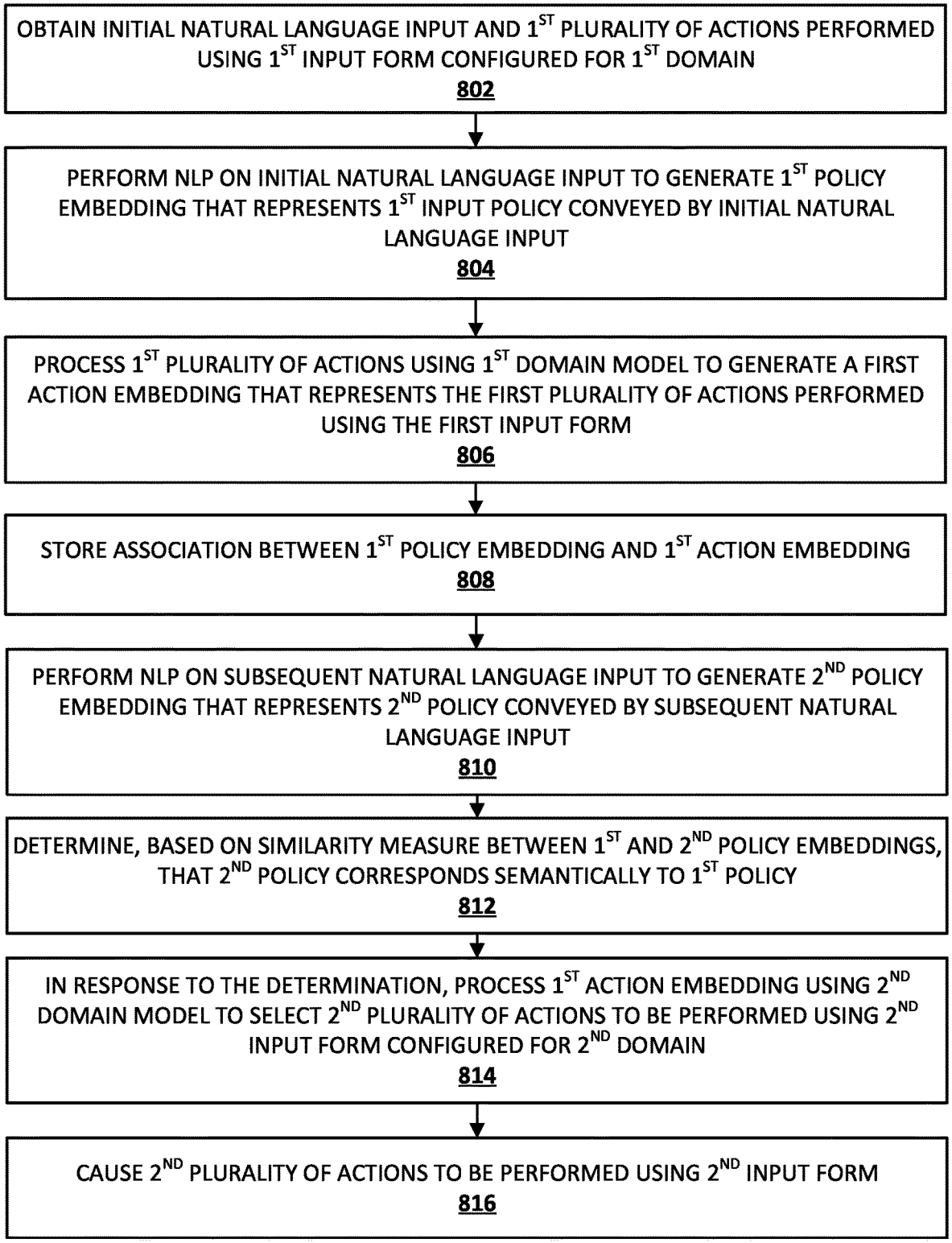
FIG. 8 is a flowchart illustrating another example method of practicing selected aspects of the present disclosure, according to implementations disclosed herein.

FIG. 8 is a flowchart illustrating another example method 800 for practicing selected aspects of the present disclosure, according to implementations disclosed herein. Method 800 represents a variation of methods 600-700 that is applicable, for instance, to the scenarios depicted in FIGS. 4A-B and 5A-B wherein actions performed using one input form (first domain) are translated to semantically-equivalent actions performed using another input form (second domain). For convenience, the operations of the flow chart are described with reference to a system that performs the operations. This system may include various components of various computer systems, such as one or more components of semantic task automation system 102. Moreover, while operations of method 800 are shown in a particular order, this is not meant to be limiting. One or more operations may be reordered, omitted or added.

At block 802, the system, e.g., by way of automation agent 122, may obtain an initial natural language input and a first plurality of actions performed using a first input form configured for a first domain. For example, in FIG. 5A, the user provided the actions first, then the natural language input, "I want to use this personal profile when I buy food." At block 804, the system, e.g., by way of automation agent 122, may perform NLP on the initial natural language input to generate a first policy embedding that represents a first input policy conveyed by the initial natural language input. In FIG. 5A, for instance, the user defines a policy where payment information associated with a "personal profile" is to be used when purchasing food.

At block 806, the system, e.g., by way of automation agent 122, may process the first plurality of actions using a first domain model to generate a first action embedding that represents the first plurality of actions performed using the first input form. As was the case with other domain models described herein, the first domain model may be trained to translate between an action space of the first domain (e.g., the specific URL of FIG. 5A or the more general domain of "food") and an action embedding space that includes the first action embedding. At block 808, the system, e.g., by way of automation agent 122, may store an association between the first policy embedding and first action embedding in memory.

At block 810, the system, e.g., by way of automation agent 122, may perform NLP on subsequent natural language input to generate a second policy embedding that represents a second policy conveyed by the subsequent natural language input. At block 812, the system, e.g., by way of automation agent 122, may determine that, based on a similarity measure between the first and second policy embeddings, the second policy corresponds semantically to the first policy. For example, in FIG. 4A, the user rejected the use of payment information associated with his or her "main work" profile, and uttered, "I want to use my marketing profile." The speech recognition output generated from this utterance was processed and matched (e.g., by AEF module 336 in FIG. 3 using Euclidean distance or cosine similarity) to a policy embedding, and hence, an action embedding, that was generated from actions performed by the user in the previous domain.

In response to the determination of block 812, at block 814, the system, e.g., by way of automation agent 122 or ML module 106, may process the first action embedding using a second domain model to select a second plurality of actions to be performed using a second input form configured for a second domain. The second domain model may be trained to translate between an action space of the second domain and the action embedding space. At block 816, the system, e.g., by way of automation agent 122, may cause the second plurality of actions to be performed using the second input form. For example, once the action embedding associated with the user's marketing profile was identified (e.g., by AEF module 336 in FIG. 3), it was applied as input across the domain model associated with the user's marketing profile to auto-populate the input fields of the input form in FIG. 4B.

Figure 9:
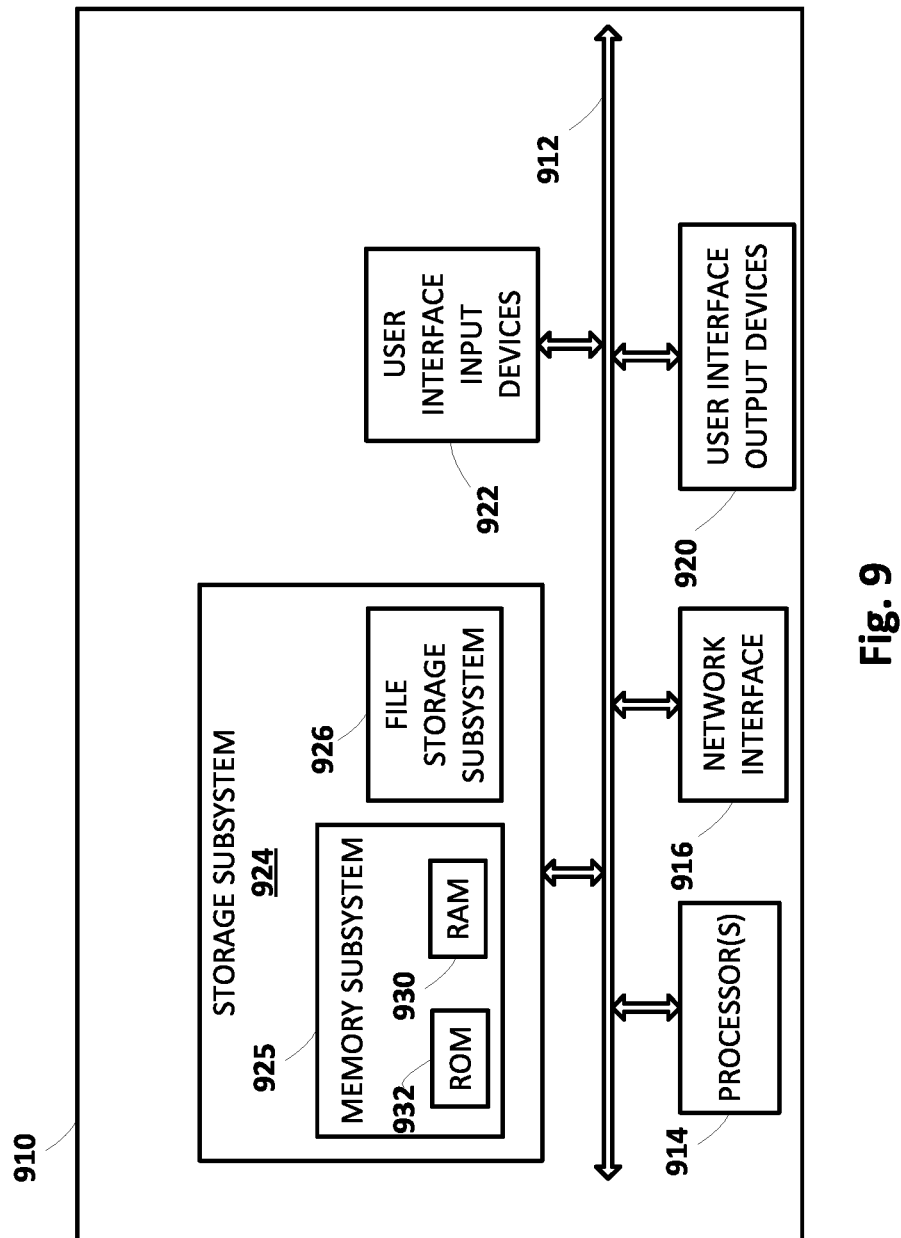
FIG. 9 illustrates an example architecture of a computing device.

FIG. 9 is a block diagram of an example computing device 910 that may optionally be utilized to perform one or more aspects of techniques described herein. In some implementations, one or more of the client computing devices 120-1 to 120-P, semantic task automation system 102, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods 600, 700, and 800 of FIGS. 6-8.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
   obtaining an initial natural language input that conveys a first task and first data indicative of a first plurality of actions performed using a first graphical user interface (GUI) rendered by a first computer application to carry out the first task;
   performing natural language processing (NLP) on the initial natural language input to generate a first task embedding that represents the first task conveyed by the initial natural language input;
   processing the first data indicative of first plurality of actions performed using the first GUI using a first domain model of a first domain to generate a first action embedding that represents the first plurality of actions performed using the first computer application, wherein the first domain model is trained to translate between an action space of the first computer application and an action embedding space that includes the first action embedding;
   storing an association between the first task embedding and first action embedding in memory;
   performing NLP on subsequent natural language input to generate a second task embedding that represents a second task conveyed by the subsequent natural language input;
   determining, based on a similarity measure between the first and second task embeddings, that the second task corresponds semantically to the first task;
   in response to the determining, processing the first action embedding using a second domain model to select a second plurality of actions to be performed using a second GUI rendered by second computer application that is different than the first application, wherein the second domain model is trained to translate between an action space of the second computer application and the action embedding space; and
   causing the second plurality of actions to be performed automatically using the second GUI rendered by the second computer application.

2. The method of claim 1, wherein at least one of the first and second computer applications comprises an operating system.

3. The method of claim 1, wherein the first plurality of actions performed using the first computer application are intercepted from data exchanged between the first computer application and an underlying operating system.

4. The method of claim 2, wherein the exchanged data includes data indicative of keystrokes and pointing device input.

5. The method of claim 1, wherein the first plurality of actions performed using the first computer application are captured from an application programming interface (API) of the first computer application.

6. The method of claim 1, wherein the first plurality of actions performed using the first computer application are captured from a domain-specific programming language associated with the first domain.

7. The method of claim 1, wherein the first plurality of actions performed using the first computer application are captured from a scripting language embedded in the first computer application.

8. The method of claim 1, wherein the first computer application is operable to exchange data with a first database having a first database schema, and the second computer application is operable to exchange data with a second database having a second database schema that is different from the first database schema.

9. The method of claim 8, wherein the first plurality of actions interact with first data from the first database in accordance with the first database schema, and the second plurality of actions interact with second data from the second database in accordance with the second database schema, and the second data corresponds semantically with the first data.

10. The method of claim 1, wherein the first computer application comprises a first communication application that has been operated to communicate with a first plurality of contacts, and the second computer application comprises a second communication application that has been operated to communicate with a second plurality of contacts.

11. The method of claim 10, wherein the second task seeks past correspondence with one or more contacts that are included in the second plurality of contacts.

12. The method of claim 11, wherein the second task also seeks past correspondence with one or more contacts that are included in the first plurality of contacts.

13. A method implemented using one or more processors and comprising:
obtaining an initial natural language input and a first plurality of actions performed using a first input form configured for a first domain;
performing natural language processing (NLP) on the initial natural language input to generate a first policy embedding that represents a first input policy conveyed by the initial natural language input;
processing the first plurality of actions using a first domain model to generate a first action embedding that represents the first plurality of actions performed using the first input form, wherein the first domain model is trained to translate between an action space of the first domain and an action embedding space that includes the first action embedding;
storing an association between the first policy embedding and first action embedding in memory;
performing NLP on subsequent natural language input to generate a second policy embedding that represents a second policy conveyed by the subsequent natural language input;
determining, based on a similarity measure between the first and second policy embeddings, that the second policy corresponds semantically to the first policy;

in response to the determining, processing the first action embedding using a second domain model to select a second plurality of actions to be performed using a second input form configured for a second domain, wherein the second domain model is trained to translate between an action space of the second domain and the action embedding space; and
causing the second plurality of actions to be performed using the second input form.

14. The method of claim 13, wherein the first plurality of actions comprise populating a first plurality of form fields with a first set of values, the second plurality of actions comprise populating a second plurality of form fields with at least some of the first set of values.

15. A system comprising one or more processors and memory storing instructions that, in response to execution of the instructions, cause the one or more processors to:
obtain an initial natural language input that conveys a first task and first data indicative of a first plurality of actions performed using a first graphical user interface (GUI) rendered by a first computer application to carry out the first task;
perform natural language processing (NLP) on the initial natural language input to generate a first task embedding that represents the first task conveyed by the initial natural language input;
process the first data indicative of first plurality of actions performed using the first GUI using a first domain model to generate a first action embedding that represents the first plurality of actions performed using the first computer application, wherein the first domain model is trained to translate between an action space of the first computer application and an action embedding space that includes the first action embedding;
store an association between the first task embedding and first action embedding in memory;
perform NLP on subsequent natural language input to generate a second task embedding that represents a second task conveyed by the subsequent natural language input;
determine, based on a similarity measure between the first and second task embeddings, that the second task corresponds semantically to the first task;
in response to the determination, process the first action embedding using a second domain model to select a second plurality of actions to be performed using a second GUI rendered by second computer application that is different than the first application, wherein the second domain model is trained to translate between an action space of the second computer application and the action embedding space; and
cause the second plurality of actions to be performed automatically using the second GUI rendered by the second computer application.

16. The system of claim 15, wherein at least one of the first and second computer applications comprises an operating system.

17. The system of claim 16, wherein the first computer application is operable to exchange data with a first database having a first database schema, and the second computer application is operable to exchange data with a second database having a second database schema that is different from the first database schema.

18. The system of claim 17, wherein the first plurality of actions interact with first data from the first database in accordance with the first database schema, and the second plurality of actions interact with second data from the second database in accordance with the second database schema, and the second data corresponds semantically with the first data.

\* \* \* \* \*